United States Patent [19]
Koch et al.

[11] Patent Number: 5,690,152
[45] Date of Patent: Nov. 25, 1997

[54] DEVICE FOR COUPLING CONTAINERS

[75] Inventors: Martin Koch, Neuenburg/Baden; Gerhard Grau, Muellheim/Baden, both of Germany

[73] Assignee: Buck Werke GmbH & Co., Bad Ueberkingen, Germany

[21] Appl. No.: 714,309

[22] Filed: Sep. 18, 1996

[30] Foreign Application Priority Data

Sep. 20, 1995 [DE] Germany ............... 195 34 915.6
Nov. 17, 1995 [DE] Germany ............... 195 42 939.7

[51] Int. Cl.⁶ .................................................. F16L 29/00
[52] U.S. Cl. ................ 141/346; 141/383; 141/351; 141/364; 137/614.01; 137/614.06; 251/304; 251/314; 251/315.1
[58] Field of Search ................ 141/346, 348–355, 141/363, 364, 368, 383, 384, 386; 137/614, 614.01, 614.06; 251/149.9, 304, 314, 315.06, 315.07, 315.1

[56] References Cited

U.S. PATENT DOCUMENTS

| | | | |
|---|---|---|---|
| 4,946,134 | 8/1990 | Orlandi | 251/314 |
| 5,054,529 | 10/1991 | Schroter et al. | 141/383 |
| 5,095,946 | 3/1992 | McLennan | 137/614.01 |
| 5,150,735 | 9/1992 | Bandy et al. | 137/614.06 |
| 5,168,900 | 12/1992 | Johnson | 251/304 |
| 5,246,041 | 9/1993 | Wiese | 141/368 |
| 5,284,182 | 2/1994 | McLennan | 137/614.01 |
| 5,295,506 | 3/1994 | Bandy et al. | 137/614.06 |
| 5,417,939 | 5/1995 | Bunschoten et al. | 141/346 |
| 5,540,266 | 7/1996 | Grau et al. | 141/383 |

Primary Examiner—J. Casimer Jacyna
Attorney, Agent, or Firm—Hill, Steadman & Simpson

[57] ABSTRACT

A device for coupling two containers comprises a pair of connecting sleeves, each having closing flaps that can be moved from a closed position to an open position by a part-turn actuator, with the outer surfaces of each closing flap facing away from the container lying flush with the outer surface of the relevant connecting sleeve in the closed position and the closing flaps are each seated in an essentially circular seal. To prevent the accidental opening of the closing flaps, each of the connecting sleeves is provided with a radially-movable pin in the wall adjacent the seal, which pin can be pushed radially inward to produce a bulge in the seal which will hold the respective closing flap in its closed position and which pin can be radially moved outward to release the flap.

15 Claims, 1 Drawing Sheet

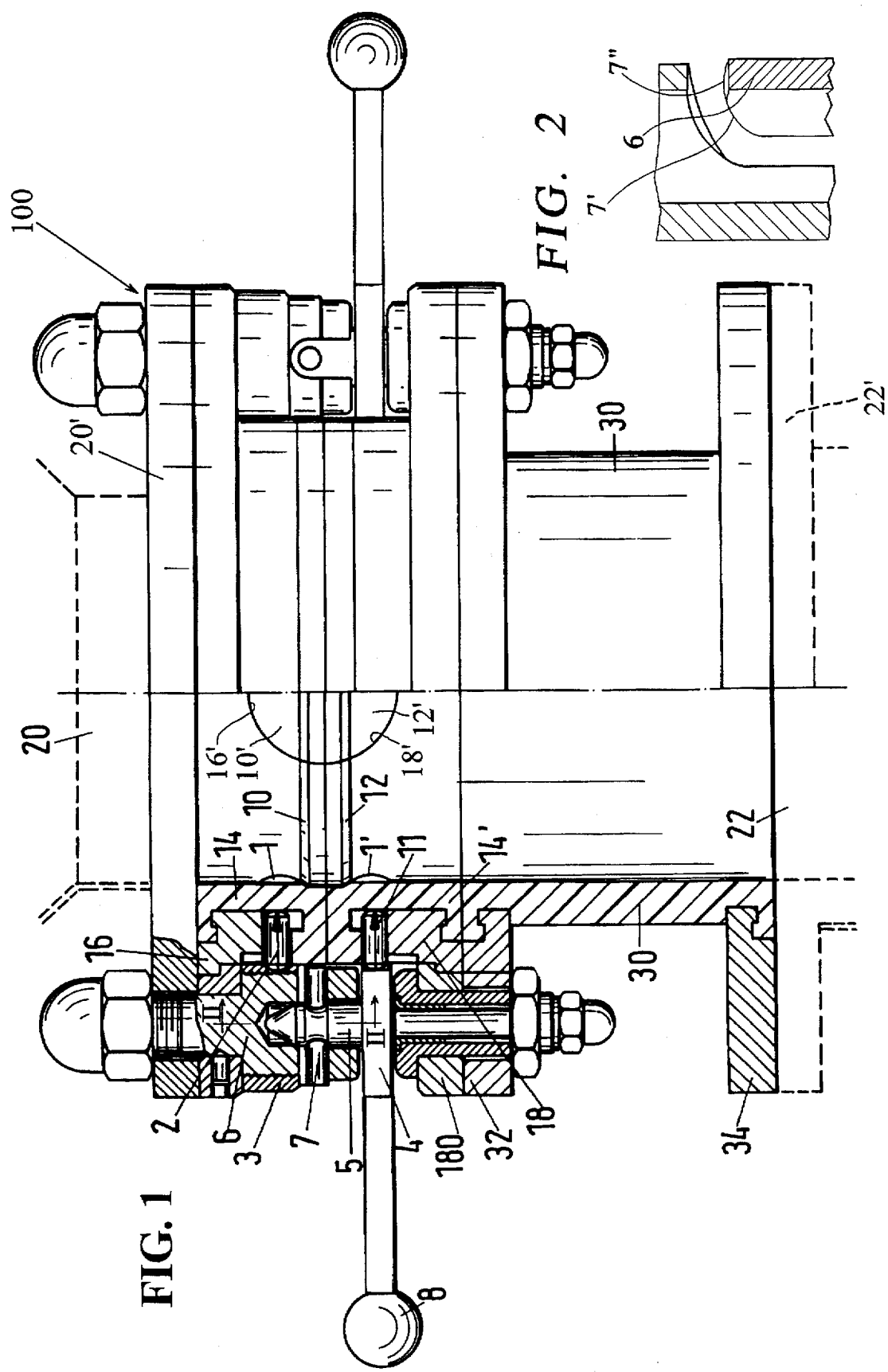

DEVICE FOR COUPLING CONTAINERS

BACKGROUND OF THE INVENTION

The present invention is directed to a device for coupling two containers together, which device comprises a terminal connecting sleeves having an essentially circular cross section and a circular seal at an outer end, each connecting sleeve has a closing flap having an essentially circular cross section near the outer end of the sleeve facing away from the container that supports it. The flap is essentially rotatable through 90° about a diameter of the connecting sleeve and has an outer diameter that essentially corresponds to the inner diameter of the connecting sleeve. Each flap can be moved from a closed position, in which it stands essentially transverse to the central longitudinal axis of the connecting sleeve and is seated in the circular seal, into an open position, in which it stands essentially parallel to the central longitudinal axis of the connecting sleeve. The closing flaps are seated in two bearing shells that lie diametrically opposite one another and are complementary to a respective half-axle that opens toward the outer end surface of the connecting sleeve and which bearing shells seat the respective half-axles having a cross section of an essentially semi-circular shape, whose flat frontal surface, turned facing away from the container, is essentially flush with the frontal outer surface of the closing flap. Each half-axle is fixedly connected with the respective closing flap, and the seating of the closing flaps is such that in the closed position, the frontal outer surfaces lie flush with the frontal outer surfaces of the connecting sleeve. Both closing flaps can be rotated between the closed and open position about a full axle formed by the two half-axles in the bearing formed from the two bearing shells after the centered mutual pressing together of the frontal surfaces of the connecting sleeves by means of a part-turn actuator engaging one of the flaps and with the entrainment of the other closing flap which is not immediately driven.

The above-type coupling device is disclosed in U.S. Pat. No. 5,540,266, whose disclosure is incorporated herein by reference thereto and which claims priority from German Application 43 42 962. Such a coupling device is used, for example, in the chemical or pharmaceutical industry. There, it is often necessary to couple containers provided with terminal connecting sleeves with one another in such a way that a free-flowing or spillable product present in one container can be transferred into the other container without the product coming into contact with the outer atmosphere.

In order to ensure this, the closing flaps provided on the respective connecting sleeves are arranged so that, in the closed position, their frontal outer surfaces lie flush with the outer end surfaces of the relevant connecting sleeve. If two containers are coupled together, the respective connecting sleeves are thus correspondingly positioned, and the closing flaps lying flush with these connecting sleeves are pressed against one another. The closing flaps are then rotated essentially through 90° as a unit so that the transport of the product from one container into the other can take place.

As a rule, a container having a connecting sleeve that is closed by an active closing flap is connected with a container whose connecting sleeve is closed with a passive closing flap. The active closing flap is, in this case, a flap connected with a part-turn actuator that can exert a force on the closing flap in order to turn this flap about an axis of rotation that lies in a diametric direction in relation to the connecting sleeve. The passive closing flap comprises no connection to this type of part-turn actuator, but rather is entrained indirectly by the active closing flap, which stands in contact with the passive closing flap, as described above.

This structure ensures that the transport of product can take place without parts of the interior of the container being exposed to the atmosphere. In addition, after the closing of the connecting sleeves and the separation of the two containers, no area of the container that has been in contact with a possibly toxic product is exposed to the atmosphere.

After the separation of the containers, there is, however, a danger that an uncontrolled opening of the closing flaps will open the container to the atmosphere. Thus, there is a possibility that the product will be exposed to the atmosphere and, thus, a possible contamination or even a free-flowing or spilling product will escape from the container.

A passive closing flap, lying in a freely-accessible manner on the outside of the connecting sleeve and not held in a closed position by the additional force of a part-turn actuator, is thereby especially subject to a particular risk of being opened by means of an accidental exertion thereon of an external force, which, for example, can be caused by contact from an operator. However, an exertion of force can also open an active closing flap if the force is large enough to also rotate the part-turn actuator. Since, in general, large forces are not needed for the part-turn actuator and the rotation of the closing flap, such an event can take place at any time during the use or transport of the containers.

SUMMARY OF THE INVENTION

An object of the present invention is to construct a device described hereinabove which is less susceptible to such disturbances.

This object is obtained by an improvement of providing at least one radially movable pin in the region of the circular seal in the wall of each of the connecting sleeves, which pin, when pushed inward radially, produces a bulge in the circular seal that will hold the respective closing flap in its closed position.

In a particularly advantageous construction of the invention, the at least one pin is actuated by means of at least one eccentric device, and the respective closing flap is locked or unlocked by the actuation of the eccentric device. In this way, a device for the locking or, respectively, the unlocking of the closing flaps is made available so that it is particularly simple to operate. The eccentric device converts a tangentially applied force into a force that works radially on the pins, so that the uniform radial displacement of the pins is ensured, since a longer lever arm is made available to the operator or to an actuator than would be in the case if the pins were displaced inward directly in a radial manner.

The invention further provides that all eccentric devices on both connecting sleeves can be actuated by means of a common actuator. This reduces the number of procedural steps required for the coupling or decoupling of the two containers and, thus, saves time. Above all, the possible failure to lock a closing flap due to inattentiveness on the part of the operator is thereby prevented.

The invention also provides that there is an additional device for the non-positive drawing together and locking of the two connecting sleeves. It is thereby ensured that the connection of the two connection sleeves during the transfer process can, in no case, become loose or even disconnected. In this way, an unintentional emergence of the free-flowing or spillable product is avoided, as is a contamination of the product by the atmosphere.

It is particularly advantageous that the at least one eccentric device and the device for the non-positive drawing together and locking of the two connecting sleeves can be actuated by means of a common actuator. In this way, a further reduction of the required procedural steps is achieved. However, a much more important advantage is that the locking or, respectively, unlocking of the two connecting sleeves and the unlocking or, respectively, locking of the two closing flaps occurs in a single procedural step, so that it is always ensured that the closing flaps can be in an open state only if the corresponding connecting sleeves are securely connected. A separation of the two connecting sleeves is possible only if the two closing flaps are in the closed position and locked therein.

In a preferred embodiment of the invention, a centering mandrel pointing in an axial direction is provided on one of the connecting sleeves and a centering sheath, fashioned so as to be essentially complementary, is provided on the other connecting sleeve for the pre-centering of the connecting sleeve. In this way, there occurs a pre-centering already during the docking process, so that a false positioning, and thereby malfunction or damage, is avoided. This also simplifies the work of the operator, who is not required to carry out a correspondingly painstaking optical centering.

It is further provided that a cross-pin is provided on the centering mandrel, which, through the actuation of a hand lever or actuator, draws the connecting sleeves together over an inclination provided in the centering sheath and locks them. A construction of this sort ensures that the pressing together and mechanical locking of the two connecting sleeves can take place without a possible malfunction. The hand lever or actuator can thereby be brought simply and uniformly into a corresponding position by the operator or automatically. The lever or actuator also serves as an optical control that displays the locking state of the system. Corresponding markings can also be attached.

Furthermore, it is particularly advantageous that the eccentric device consists of an eccentric sleeve or sheath on the centering sheath and of an eccentrically-shaped part of the centering mandrel, whereby, during the rotation of the centering mandrel, the eccentric sleeve is entrained by the cross-pin. By this means, the two closing flaps are locked or, respectively, unlocked by a single operating step, namely the rotation of the centering mandrel. The above-described advantage of the common actuator of the respective eccentric device of the individual connecting sleeves are thereby realized.

The invention further provides that one or both closing flaps is/are float-mounted. The float mounting is required in all automatic docking processes, in order to enable the centering of the connecting sleeves and, in particular, of the half-flaps. To construct a sleeve in a floating manner, it is known from the prior art to interrupt the sleeve into two ends and to connect the two ends by means of a silicone collar. Apart from the fact that an expensive mounting by means of tightening straps is necessary at the interface between the product sleeve and the silicone collar, the problem often occurs that the connection is not tight or combines with this material, which material must be removed by an expensive process. At the same time, susceptibility to disturbances is increased by the multiplicity of components that are necessary to ensure the function.

It is thus particularly preferred that the collar be fixedly connected both ends, respectively, with the connecting element, whereby one of the connecting elements can be fixed in the docking area of the first connecting sleeve of the coupling device and the other connecting element can be fixed in the docking area of the second connecting sleeve or, respectively, one of the connection elements is fixed on the side of one of the connecting sleeves that is turned away from the docking area, and the other connection element can be fixed on a product sleeve connected with the coupling device.

The floating mount is fashioned as a module that, in the preferred application, is coupled to one of the half-flaps, on the one hand, and to the product sleeve that continues further, on the other hand. The floating mount is thereby attached as a module under the active half-flap, i.e., the one that is actuated immediately by the part-turn actuator. During the docking process, the passive flap is applied to the active flap. The floating device permits the active flap to be fitted to fit the position of the passive flap, and a simple centering can occur via the centering means of the half-flaps. By this means, it is ensured that the positioning of the closing flap is automatically adjusted very precisely and that, above all, the necessary pressure of application is held within a previously-determined range. By this means, wear is reduced and corresponding parts subject to wear have a longer lifespan in which they can perform their function without impairment. The floating mount equalizes axial offset, angular offset and height offset. In addition, it allows several functions to be combined into one component. The product sleeve is, at the same time, the floating mount and additionally an axial seal to the adjacent components.

At least one of the connecting elements should preferably be a flange. It is further proven advantageous for the collar to be made of an elastomer.

The specified floating mount can be used not only in the system identified in the above-mentioned U.S. Patent or in a system having the inventively addressed locking, but rather, in general, whenever terminal connecting sleeves, product sleeves, etc., are to be coupled.

Other advantages and features of the invention will be readily apparent from the following description of the preferred embodiments, the drawings and claims.

BRIEF DESCRIPTION OF THE DRAWINGS

FIG. 1 is a side view with a partial cross sectional view cut through the central longitudinal axis of two coupled connecting sleeves; and FIG. 2 is a cross sectional view with portions removed for purposes of illustration taken along the lines II—II of FIG. 1.

DESCRIPTION OF THE PREFERRED EMBODIMENTS

The principles of the present invention are particularly useful when incorporated in a device, generally indicated at 100 in FIG. 1, for coupling two product sleeves or containers 20 and 22 together. As illustrated, the product sleeve 20 has a flange 20', which is connected to a terminal connecting sleeve 16, for a first or passive closing flap 10, which has a half-axle 10' received in a half-bearing shell 16', and is illustrated in a position closing the first connecting sleeve 16 and the product sleeve 20. A second terminal connecting sleeve 18, which mounts a second closing flap 12 which has a half-axle 12' received in a half-bearing shell 18', is coupled to a flange 22' of the second product sleeve or container 22 by a floating mount, which includes an upper annular flange 32 and a lower annular flange 34 which are interconnected together by a collar 30. For this purpose, the terminal connecting sleeve 18 that surrounds the second closing flap 12 has, on its underside, a circumferential connecting flange 180, which is connected to the flange 32 of the floating mount.

More specifically, as mentioned, the floating mount's collar is made of a silicone or like material, and the collar has both ends respectively connected to the upper annular flange 32 and the lower annular flange 34. The floating mount is connected to the connecting flange 180 with the upper annular flange 32. The lower flange 34 is connected to a flange 22' of the second product sleeve 22.

In the exemplary embodiment, the closing flap 12 is an active flap that is actuated immediately by the part-turn actuator, while the flap 10 is a passive flap that is not actuated directly by the part-turn actuator. The passive flap 10 is turned indirectly in the docked state by the closing flap 12, along with this flap, as the two half-axles 10' and 12' are mated together, as illustrated. The actual workings of the device are set forth in greater detail in the above-mentioned U.S. Patent.

In the docking process itself, the terminal connecting sleeves 16 and 18 are positioned and guided by the engaging of a centering mandrel 5 in a centering sheath or sleeve 6. The two terminal connecting sleeves 16 and 18 are brought close to one another so that the closing flap 10 of the terminal connecting sleeve 16 and the closing flap 12 of the terminal connecting sleeve 18 lie on one another.

The floating mount formed by the collar 30 and the flanges 32 and 34 thus enables the second closing flap 12 to fit in its position on the first closing flap 10 so that the axial offset, angular offset and the height offset are equalized by the flexible, elastic material of the floating mount.

Fine centering means (not shown here) can be provided in the form of at least one additional centering pin attached to the closing flap 12 and at least one additional centering bore that works together with the centering pin and is attached to the closing flap 10. Such an arrangement is illustrated and described in the above-mentioned U.S. Patent. By this means, an exact mutual centering of the closing flaps is enabled, which also enables a trouble-free common rotation of the two flaps.

By means of an actuation of a hand lever 8, which serves as a common actuator both for the eccentric devices 3 and 4 and for the locking device 7, several tasks can be performed. The cross-pin 7 attached to the centering mandrel 5 is turned by an actuation of the hand lever 8. The pin thus engages in a bevel or cam surface 7' (FIG. 2), which is machined into the centering sleeve 6 and draws the terminal connecting sleeves 16 and 18 toward one another. In the end position of the hand lever, the cross-pin 7 snaps into an end position or recess 7" machined out of the centering sheath 6 by which means the two terminal connecting sleeve 16 and 18 and, with them, the product sleeves 20 and 21 are reliably connected with one another and the required application pressure for a reliable functioning of the apparatus is obtained.

In addition, by means of an actuation of the hand lever 8, an eccentrically-shaped part 4 of the centering mandrel 5 is rotated. In this way, the force exerted by the shaped part 4 of the centering mandrel 5 of the pin 11 is reduced, and the motion of the pin in a direction pointing radially outward is obtained. The pin 11 is pressed radially outward by the force operating on it from the elastic seal 14', so that the bulge 1' in the interior of the terminal connecting sleeve 18 disappears.

The cross-pin 7 attached to the centering mandrel 5 is also rotated. The eccentric sleeve 3 on the sheath 6 is entrained by the cross-pin 7 and, likewise, releases the pin 2. The pin 2 moves radially outward and the bulge 1 in the seal 14 of the terminal connecting sleeve 16 disappears.

With a pressing together and locking of the two terminal connecting sleeves 16 and 18, the two closing flaps 10 and 12 are, thus, released at the same time so that they can be turned essentially 90° by the part-turn actuator, which acts on the half-axle 12'. A direct connection of the containers through the product sleeves 20 and 22 is thus cleared and the product transport can take place.

A separation of the product sleeves 20 and 22 or, respectively, the terminal connecting sleeves 16 and 18 is not possible until the two closing flaps 10 and 12 are again in the closed state. Only then can the operating lever be actuated, whereby, at the same time, the two pins 10 and 11 are pushed by the eccentric sleeve 3 on the centering sheath 6 and the eccentrically-shaped part 4 of the centering mandrel 5 radially inward to create the two bulges 1 and 1' in the interior of the connecting sleeve to lock the closing flaps 10 and 12 in their closed position. The locking of the two terminal connecting sleeves 16 and 18 is then disengaged and the two product sleeves 20 and 22 can then be separated from one another.

In the separated state, the closing flaps 10 and 12 are secured against accidental opening by means of the pressure possibly exerted in these closing flaps 10 and 12 by the bulges 1 and 1'.

Although various minor modifications may be suggested by those versed in the art, it should be understood that we wish to embody within the scope of the patent granted hereon all such modifications as reasonably and properly come within the scope of our contribution to the art.

We claim:

1. In a device for coupling two containers having terminal connecting branches having an essentially circular cross section, said device including a pair of connecting sleeves having a circular cross section with one end being connectable to the connecting branches, each of said sleeves, at an outer end, having a circular seal and a pair of half-shell bearings lying diametrically opposite each other with each half-shell bearing having a semi-circular cross section, a closing flap having a substantially flat planar outer surface with a pair of half-axles having a semi-circular cross section extending diametrically opposite thereof, said closing flap being mounted for rotation with the half-axles disposed in the half-shell bearings and movable between a closed position with the flat surface of the flap and half-axles being flush with an end surface of the connecting sleeve and the flap seated in the circular seal to an open position extending approximately 90° from the closed position, said flaps having their exposed surfaces engaging each other to form a full axle as the end surfaces of the two connecting sleeves are brought together, and a part-turn actuator engaging one of the flaps to rotate the flap between the open and closed position while the other flap is entrained to move therewith, the improvement comprising at least one radially-movable pin being provided in a wall of each of the connecting sleeves at the height of the circular seal, said pin being pushed radially inward producing a bulge in the circular seal for holding the respective closing flap in the closed position.

2. In a device according to claim 1, wherein said at least one pin is to be actuated by means of at least one eccentric device and the respective closing flap is locked and unlocked by means of an actuation of the eccentric device.

3. In a device according to claim 2, wherein all eccentric devices on both connecting sleeves can be actuated by means of a common actuator.

4. In a device according to claim 1, wherein an additional device is provided for the non-positive drawing together and locking of the two connecting sleeves.

5. In a device according to claim 4, wherein at least one eccentric device and the device for the non-positive drawing together and locking of the two connecting sleeves can be actuated by means of a common actuator.

6. In a device according to claim 1, wherein a centering mandrel pointing in the axial direction is provided on one of the connecting sleeves, and a centering sheath of essentially complementary construction is provided on the other connecting sleeve for the pre-centering of the connecting sleeves.

7. In a device according to claim 6, wherein a cross-pin is provided on the centering mandrel, and a cam surface is provided on the centering sheath, said pin being moved on the cam surface by means of actuation of a hand lever to draw the connecting sleeves together.

8. In a device according to claim 7, which includes an eccentric device consisting of an eccentric sleeve on the centering sheath and an eccentrically-shaped part on the centering mandrel, said eccentric sleeve being entrained by the cross-pin during rotation of the centering mandrel with the eccentric part and eccentric sleeve forming means for actuating the pin between a locked and unlocked position.

9. In a device according to claim 1, which includes at least one of the two connecting sleeves being float mounted.

10. In a device according to claim 9, wherein the floating mount comprises a collar made of a flexible material which is fixedly connected at both ends with a connecting element, one of said connecting elements being fixed to one connecting sleeve of the coupling device, and the other connecting element being fixed to a connecting branch that is connected with the coupling device.

11. In a device according to claim 10, wherein the at least one connecting element is a flange.

12. In a device according to claim 10, wherein the collar is made of an elastomer material.

13. In a device according to claim 10, wherein a centering mandrel pointing in the axial direction is provided on one of the connecting sleeves and a centering sheath of an essentially complementary construction is provided on the other connecting sleeves for a pre-centering of the connecting sleeves during interconnection therebetween.

14. In a device according to claim 13, wherein a cross-pin is provided on the centering mandrel, said cross-pin engaging a cam surface provided on the centering sheath so that rotation of the centering mandrel causes the pin to move along the cam surface to draw the two connecting sleeves together.

15. In a device according to claim 14, wherein an eccentric device consisting of an eccentric sleeve on the centering sheaths and an eccentrically-shaped part on the centering mandrel are provided for actuating the radially-movable pins, wherein the eccentric sleeve and the centering sheath are entrained by the cross-pin during rotation of the centering mandrel.

* * * * *